United States Patent
Pathak et al.

(10) Patent No.: US 12,277,449 B1
(45) Date of Patent: Apr. 15, 2025

(54) ADAPTIVE SLEEP VIRTUAL MACHINES IN A CLOUD PROVIDER NETWORK

(71) Applicant: Amazon Technologies, Inc., Seattle, WA (US)

(72) Inventors: Rahul Pathak, Mercer Island, WA (US); Dallas Lamont Willett, Albuquerque, NM (US); Jeff Thomas Carter, Bellevue, WA (US); Anthony A Virtuoso, Hawthorne, NJ (US); Robin Alan Golden, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 498 days.

(21) Appl. No.: 17/702,467

(22) Filed: Mar. 23, 2022

(51) Int. Cl.
*G06F 9/50* (2006.01)
*G06F 9/455* (2018.01)

(52) U.S. Cl.
CPC ........ *G06F 9/5038* (2013.01); *G06F 9/45558* (2013.01); *G06F 9/5077* (2013.01); *G06F 2009/45575* (2013.01)

(58) Field of Classification Search
CPC .. G06F 9/5038; G06F 9/45558; G06F 9/5077; G06F 2009/45575
See application file for complete search history.

(56) References Cited

U.S. PATENT DOCUMENTS

| | | | |
|---|---|---|---|
| 9,645,847 B1 * | 5/2017 | Roth | G06F 9/461 |
| 10,649,768 B1 * | 5/2020 | Resios | G06F 11/3664 |
| 11,947,988 B1 * | 4/2024 | Kulkarni | G06F 9/45558 |
| 2015/0237132 A1 * | 8/2015 | Antony | H04L 67/10 709/224 |
| 2020/0218574 A1 * | 7/2020 | Novak | G06F 9/5088 |
| 2020/0379790 A1 * | 12/2020 | Bansal | G06F 9/45545 |

* cited by examiner

*Primary Examiner* — Sisley N Kim
(74) *Attorney, Agent, or Firm* — Nicholson De Vos Webster & Elliott LLP

(57) ABSTRACT

Techniques for adaptive sleep virtual machine management are described. A service of a provider network receives a parameter indicating that a first virtual machine can be slept and determines to sleep the first virtual machine based at least in part on the parameter. A state of the first virtual machine is captured, and the first virtual machine is terminated. The service determines to resume the captured state of the first virtual machine based at least in part on an indication. A second virtual machine is launched using the captured state of the first virtual machine and resumes execution of the captured state of the first virtual machine. A proxy server sends traffic to the first virtual machine before the termination of the first virtual machine and to the second virtual machine after the resumption of execution of the captured state of the first virtual machine by the second virtual machine.

19 Claims, 9 Drawing Sheets

ADAPTIVE SLEEP VIRTUAL MACHINES IN A CLOUD PROVIDER NETWORK

BACKGROUND

The advent of virtualization technologies has facilitated the rapid expansion of cloud provider networks. A cloud provider networks (or just "cloud") typically refers to a large pool of accessible virtualized computing resources (such as compute, storage, and networking resources, applications, and services).

BRIEF DESCRIPTION OF DRAWINGS

Various embodiments in accordance with the present disclosure will be described with reference to the following drawings.

DETAILED DESCRIPTION

Figure 1:
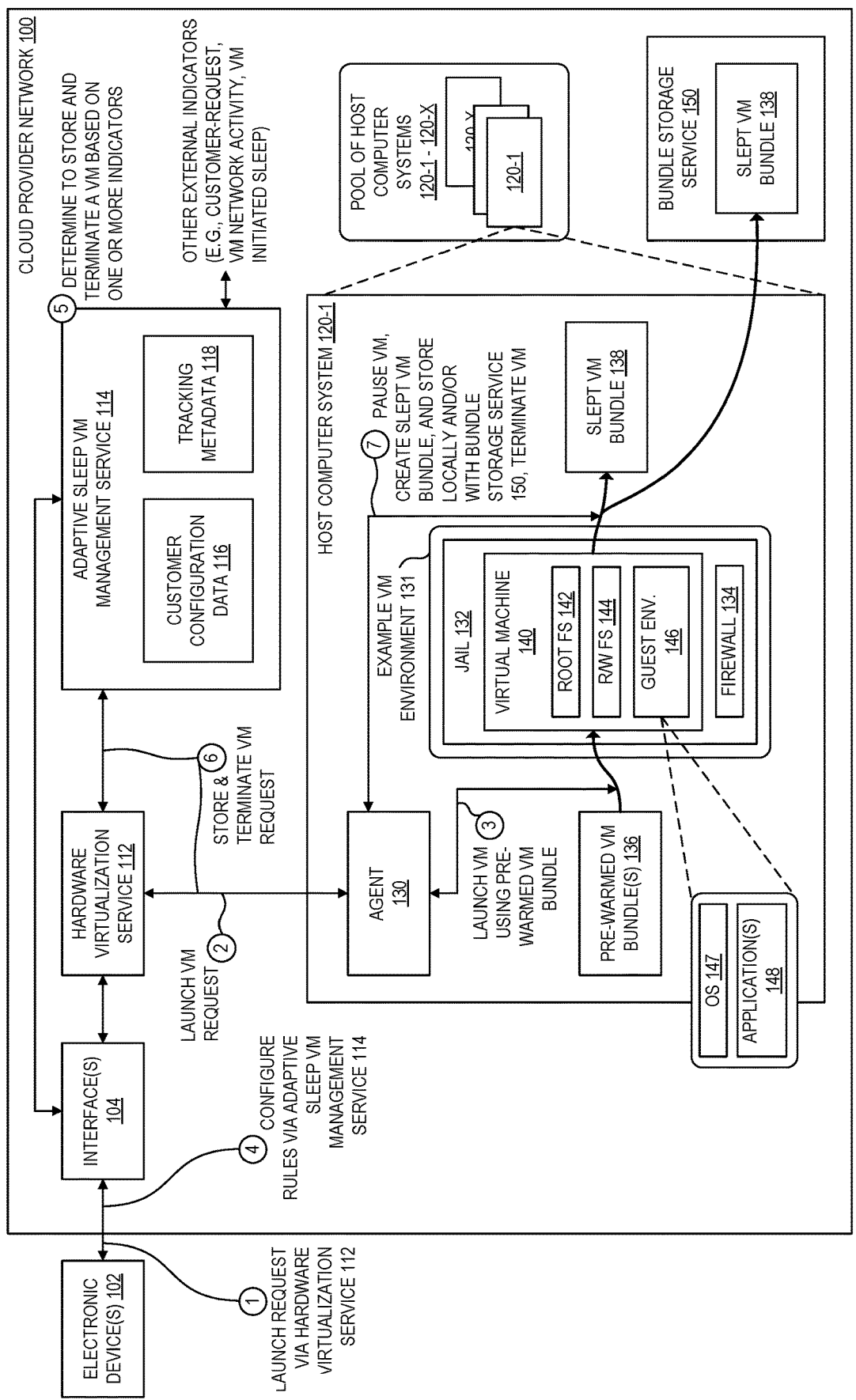
FIG. 1 is a diagram illustrating sleeping a virtual machine in a cloud provider network according to some embodiments.

The present disclosure relates to methods, apparatus, systems, and non-transitory computer-readable storage media for an adaptive sleep virtual machine in a cloud provider network. Cloud provider networks often include pools of host computer systems that provide compute, storage, and other capacity to satisfy customer requirements. To make efficient and secure use of these host system resources, virtualization technologies are often employed to allocate portions of a host computer system's resources to many "virtual" computer instances that support different customer computing requirements. Exemplary compute instances include virtual machines (VMs), containers, and other related technologies that facilitate the sharing of a host computer system's resources. For example, the cloud provider network may launch a database server executing within one virtual machine for one customer using a portion of a host computer system's resources and launch an analytics software application executing within another virtual machine for the same or another customer using a different portion of that same host computer system's resources. In this manner, the database server and the analytics software application operate in their own environment without knowledge of each other despite being supported by the same host computer system. Although the amount of host computer system resources available for virtualization within a cloud provider network is often vast, it is not infinite. There may be physical limitations (e.g., a number of processors) as well as software limitations (e.g., a finite number of concurrent versions of a particular software application may be licensed within the cloud provider network), amongst other limitations.

In some cases, the application(s) executing within a compute instance and supporting a customer's requirements encounter periods of lessened (or even idle) activity-they may idle when not responding to external requests, process data according to some schedule, and/or periodically check for work (e.g., in a shared "mailbox"), etc. Additionally, some customers may want to prioritize some of their instances over other ones. Embodiments described herein include an architecture that permits the transition of these less-than-full utilization and/or lower priority computer applications between paused and active states. As a very simplified example, if a host computer system could typically support eight "always-on" virtual machines that each consumed the same amount of resources while the applications executing within those virtual machines were only active 50% of the time, that host computer system could support up to sixteen of such applications if managed through paused and active periods of time.

At a high level, an adaptive sleep virtual machine's lifetime proceeds through periods of execution interleaved with periods of sleep. Doing so provides several advantages. Each time the virtual machine is "slept," the cloud provider network can preserve its state and terminate the virtual machine. In doing so, the cloud provider network can re-allocate the host system resources previously allocated to the terminated virtual machine for other tasks. Additionally, each time a virtual machine is resumed from the previously preserved state, the cloud provider network can allocate resources to that virtual machine using a different host system. In doing so, the cloud provider network can optimize its overall usage of host computer system resources.

The pause and resume cycle of an adaptive sleep virtual machine typically proceeds follows. First, the original virtual machine is paused. State information about that virtual machine is stored to allow another virtual machine to be resumed at a later time. When in a stored state, the adaptive sleep virtual machine can be considered "slept" or "suspended." Note that in a slept state, the adaptive sleep virtual machine is not a virtual machine in the traditional sense in that it is not being executing by a host computer system using resources allocated to a virtual machine. The paused virtual machine is then terminated, freeing host computer system resources (e.g., processor capacity, memory capacity, software licenses, etc.) for other uses. Sometime later, the adaptive sleep virtual machine is resumed by launching a new compute instance using the stored state information.

In some embodiments, the pausing and resuming of adaptive sleep virtual machines is managed by an adaptive sleep virtual machine (VM) management service, which may be part of a control plane of the cloud provider network. By leveraging periods of inactivity or enforcing customer-specified priorities such as described above, the adaptive sleep VM management service can "oversubscribe" physical resources of host computer systems or other resources in that the amount of a given resource needed by some set of adaptive sleep virtual machines (including those preserved in a slept state) can exceed the available amount of that resource. For example, if a customer has five software licenses, the adaptive sleep VM management service can enable the customer to share those five licenses amongst a greater number of adaptive sleep virtual machines provided that the number of running instances does not exceed the available licenses.

In some embodiments, the adaptive sleep VM management service enables customers to impose various restrictions on their usage of the cloud provider network's host computer system resources. For example, a customer might be sensitive to cost and thus indicate that certain compute instances have a higher priority than others while also setting a limit on the number of active virtual machines to be hosted at any given time. In such a case, the adaptive sleep VM management service may pause a lower-priority compute instance in order to resume a higher-priority one.

In some embodiments, a proxy server handles traffic flow between an adaptive sleep virtual machine and other network endpoints (e.g., customer client devices, third-party client devices, other cloud provider services, other hosted virtual machines, etc.). The proxy server can be configured to handle various kinds of traffic in different ways. For example, the proxy server can simulate responses to certain kinds of traffic directed to a slept virtual machine or application executed therein. Additionally, the proxy server can be configured to indicate or otherwise notify the adaptive sleep VM management service upon receipt of certain kinds of traffic so that a slept virtual machine or application preserved therein can be resumed.

FIG. 1 is a diagram illustrating sleeping a virtual machine in a cloud provider network according to some embodiments. A cloud provider network 100 (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services. In some embodiments, the cloud provider network can extend to hardware and software resources that are on a customer's premises (so-called "on-prem" systems). For example, the cloud provider network can establish communications with resources provisioned to a customer and installed at a customer facility. In the illustrated embodiment, the cloud provider network 100 includes a pool of host computer systems 120-1 to 120-X where X is some number of host computer systems.

A cloud provider network 100 can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a cloud provider network 100 can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, cloud provider networks 100 often rely upon virtualization techniques. For example, virtualization technologies can provide users the ability to control or use compute resources (e.g., a "compute instance," such as a virtual machine using a guest operating system (O/S) that operates using a hypervisor that might or might not further operate on top of an underlying host O/S, a container that might or might not operate in a virtual machine, a compute instance that can execute on "bare metal" hardware without an underlying hypervisor), where one or multiple compute resources can be implemented using a single host computer system.

A hardware virtualization service 112 (referred to in various implementations as an elastic compute service, a virtual machines service, a computing cloud service, a compute engine, or a cloud compute service) can enable users of the cloud provider network 100 to provision and manage compute instances such as virtual machines. The hardware virtualization service 112 often interfaces with a local agent such as agent 130 present on host computer systems. Generally speaking, the agent 130 manages the lifecycle of compute instances hosted by a host computer system as directed by the hardware virtualization service 112. In some embodiments, the agent 130 is a virtual machine manager (VMM) such as a hypervisor. In some embodiments, the agent 130 is a lightweight VMM that can enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

The agent 130 can execute using the same host computer system resources that are provisioned for compute instances or on separate, dedicated hardware such as, for example, an offload card installed in the host computer system. Such an offload card can be a card connected via PCI or PCIe to the physical CPUs and other components of the host and include one or more CPUs that are not available to compute instances, but rather are dedicated to instance management tasks such as virtual machine management, input/output virtualization to network-attached storage volumes, local migration management tasks, instance health monitoring, and the like.

As used herein, launching a compute instance generally includes reserving resources (e.g., computational and memory resources) of an underlying physical compute instance (e.g., from a pool of available host computer systems such as 120-1 to 120-X), installing or launching required software (e.g., an operating system), and making the virtual compute instance available to the client for performing tasks specified by the client.

The users (or "customers") of the cloud provider networks 100 can use one or more user accounts that are associated with a customer account, though these terms can be used somewhat interchangeably depending upon the context of use. Users can interact with a provider network 100 across one or more intermediate networks (e.g., the internet) via one or more interface(s) 104, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 104 can be part of, or serve as a front-end to, the control plane of the cloud provider network 100 that includes "backend" services. For example, the hardware virtualization service 112 and an adaptive sleep VM management service 114 can be considered part of the control plane of the cloud provider network 100.

The adaptive sleep VM management service 114 generally initiates the "sleep" workflow and the "resume" workflow of compute instances. At a high level, the "sleep" workflow typically involves pausing an executing compute instance (thereby also pausing any application(s) executing in the virtual machine), capturing and storing state information from which the paused state of the compute instance can be re-created, and terminating the compute instance thereby freeing host system resources. Conversely, the "resume" workflow typically involves launching a new compute instance using the stored state information to place the new compute instance in a state matching that of the previously paused, now terminated compute instance before allowing the new virtual machine to resume execution (and thereby resuming or waking the application(s)). In some embodiments, the adaptive sleep VM management service 114 also enforces customer-specified cost and/or licensing control measures across all (or some subset) of the compute instances associated with the customer's account.

An exemplary set of operations amongst components illustrated in FIG. 1 is now described with reference to circled numbers 1-7.

As indicated at circle 1, an electronic device 102 sends a request to launch a virtual machine to the hardware virtualization service 112 via an interface 104. The electronic device 102 may be operated by or otherwise under the control of a user, and, while illustrated as being outside of the cloud provider network 100, the electronic device 102 may likewise be inside of the cloud provider network (e.g., as another compute instance under the control of a user). Often, the launch request will include an identification of various launch configuration parameters for the requested virtual machine. Such parameters may be identified directly (e.g., a number of virtual CPUs, an amount of memory) or indirectly (e.g., a pre-defined compute instance type). Exemplary launch configuration parameters include a virtual machine hardware configuration (HW_CONFIG), a virtual machine software configuration (SW_CONFIG), a virtual machine network configuration (NETWORK_CONFIG). The virtual machine hardware configuration can include, for example, the amount of host computer system resources to allocate to the virtual machine (e.g., a number of vCPUs, an amount of memory, etc.). The virtual machine software configuration can include information indicating which software is executed by the virtual machine (e.g., for license account purposes). The virtual machine network configuration can include data detailing at least a portion of the network address to assign to the virtual machine, various firewall configuration rules, whether any special connections are to be created (e.g., to other cloud provider network services, to other customer virtual machines), and so on.

Upon receipt of the launch request, the hardware virtualization service 112 will select a host computer system 120 from the pool of host computer systems 120-1 to 120-X based on which host computer systems 120 can support the requested configuration (e.g., has the required hardware and capacity).

In some embodiments, the hardware virtualization service 112 assigns a persistent identifier to the requested "instance." Such a persistent identifier can uniquely identify the "instance" for its entire lifetime until it is explicitly terminated even though the underlying compute instances executing that requested instance may change (e.g., when the requested instance exists as a bundle rather than an executing compute instance). In other words, from the customer's perspective, the persistent identifier identifies that customer's compute instance even though the underlying compute instances on host computer systems that execute the customer's compute instance can change over time as they are paused, stored, and terminated and later launched and resumed. For example, an identifier "DEF" that persists from the customer's perspective could identify a first compute instance executing on one host computer system at a first point in time, a second compute instance executing on another host computer system at a second point in time, and a bundle at a third point in time (between the first and second points) that stored the state information of the first compute instance before being resumed using the second compute instance. In some embodiments, this persistent identifier might also serve as at least a portion of a network address for a virtual machine when executing the "instance."

In this example, the hardware virtualization service 112 selects a host computer system 120-1. As indicated at circle 2, the hardware virtualization service 112 sends a launch request to the agent 130 of the host computer system 120-1. In some embodiments, the request sent to the agent 130 includes an indication of the configuration of the virtual machine to be launched (e.g., HW_CONFIG, SW_CONFIG, NETWORK_CONFIG). In such a case, the agent 130 will allocate resources for the virtual machine, fetch any unavailable software from a repository, boot the virtual machine and associated software, and make the appropriate networking connections between the virtual machine and the outside environment. In other embodiments, hardware and software launch configuration parameters are memorialized as part of a bundle. An exemplary bundle includes a snapshot of a state of a paused virtual machine (e.g., processor memory, system memory, file system(s)). A bundle may further include metadata (e.g., hardware and software launch configuration parameters). "Pre-warmed" bundles are typically previously captured with application(s) in a booted state but before performing any customer-specific operations. Such bundles 136 can then be pre-loaded onto host computer systems 120 to reduce the launch time of a compute instance. In the illustrated example, the hardware virtualization service 120 may have selected the host computer system 120-1 not only because it had capacity to support the requested instance but because it included a pre-warmed VM bundle 136 that met the requested hardware and software launch configuration parameters. When launching via a bundle, the request sent to the agent 130 can include an identification of a bundle from which to launch the virtual machine and any instance-specific network launch configuration parameters.

In some embodiments, the agent 130 can launch a requested virtual machine without using a pre-warmed bundle. For example, the hardware virtualization service 130 may parameterize the requirements for the virtual machine as part of the bundle, and the agent 130 can create a virtual machine per those parameters. As another example, the agent 130 may fetch a configuration from another location or service (not shown). Such a configuration might be a bundle, a machine image, etc.

In some embodiments, the request to the agent 130 may further include an identifier for the agent 130 to associate with a launched compute instance, such as the persistent identifier described above, to allow the hardware virtualization service 112 to make subsequent reference to the resulting launched compute instance.

As indicated at circle 3, the agent 130 launches a virtual machine 140, in this case, using a pre-warmed VM bundle 136. An exemplary VM environment 131 is shown. In this example, the virtual machine 140 operates within a jail 132. A jail refers to one or more containment layers provided by the host computer system environment (e.g., a host operating system) to limit (or prevent) access of processes executing within the jail from the broader host environment. Such jailing techniques may also be referred to as "sandboxing" the virtual machine environment. Additionally, the virtual machine environment 131 includes a firewall 134. The firewall 134 can be used to control inbound traffic destined to the virtual machine and outbound traffic originating from the virtual machine. In this example, the exemplary virtual machine 140 includes a root file system 142 (typically read-only) and a read/write file system 144, although a single file system may be used. The virtual machine 132A further includes a guest environment 146, so-named typically because the guest environment executes untrusted code (e.g., customer code). In this example, the guest environment 146 includes an operating system 147 and one or more applications 148 supporting a customer's computing requirements (e.g., a web server, a database server, a game server, an analytics tool server, etc.). Once launched and running, the virtual machine 140 can begin executing the application(s) 148.

A successful launch of the virtual machine 140 may be followed by responses indicating such a success flowing back from the agent 130 to the hardware virtualization service 112 (in response to the launch request at circle 2) and from the hardware virtualization service 112 to the electronic device 102 (in response to the launch request at circle 1). The response from the hardware virtualization service 112 to the electronic device 102 may further include an identifier (e.g., a persistent identifier) for the customer to use in making subsequent reference to the launched virtual machine 140.

As indicated at circle 4, an electronic device 102 configures rules with the adaptive sleep VM management service 114 via the interface 104. Again, this electronic device 102 may be operated by or otherwise under the control of a user, and, while illustrated as being outside of the cloud provider network 100, the electronic device 102 may likewise be inside of the cloud provider network (e.g., as another compute instance under the control of a user). The adaptive sleep VM management service 116 stores the customer's rules, which may also be referred to as sleep configuration parameters, as customer configuration data 116, which likely contains sleep parameters for many customers. Sleep configuration parameters can be instance-specific, account-wide, or specified for groups of instances (e.g., the customer's development VMs; the customers production VMs, web server VMs, etc.).

One exemplary configuration parameter is an enable to allow the adaptive sleep VM management service 114 to manage a given compute instance (or group of instances) through the store and termination and the launch and resume processes.

Another exemplary configuration parameter is a schedule for a compute instance (or group of instances). The customer may specify certain periods of time during the day, days during the week, etc. during which the compute instance(s) should be active.

Another exemplary configuration parameter is a priority level for a compute instance (or group of instances). The adaptive sleep VM management service 114 can use a priority level associated with each instance to determine which compute instances to store and terminate when customer-specified account limits (described below) are reached. Exemplary priority levels might be based on a ranking of compute instances (e.g., priority 1, priority 2, priority 3, and so on) or a categorization of compute instances (e.g., high priority, medium priority, low priority).

Another exemplary configuration parameter (or parameters) are account limits. These limits may be useful in controlling, or staying compliant with, software licensing, as well as imposing cost controls. Exemplary limits include: a maximum number of running compute instances to not be exceeded; a maximum over-subscription of infrastructure resources (CPU, memory, network bandwidth, storage) to not be exceeded; a maximum monetary amount for compute instances to not be exceeded; a maximum number of user, device, or virtual machine software licenses to not be exceeded; a named user, named device, or named virtual machine software license to not be reused; a software license is confined to a set of regions, availability zones, data centers, or physical locations; all or part of a software license is running on a specific number of host computer systems; a maximum number of CPU cores to not be exceeded; a maximum number of virtual CPU cores to not be exceeded; a maximum number of processor sockets to not be exceeded; and a maximum monetary amount for software licensing to not be exceeded.

Another exemplary configuration parameter is a preemption enable to allow the adaptive sleep VM management service 114 to preemptively store and terminate compute instances when customer's compute instances are close to reaching or have reached a customer-specified account limit. For example, if the customer has limited its fleet of compute instances to 50 CPUs and its currently executing compute instances are allocated 50 CPUs, the adaptive sleep VM management service 114 can preemptively pause and terminate one of the lower priority executing compute instances so that another can be launched without waiting for a pause and terminate.

As indicated at circle 5, at some point the adaptive sleep VM management service 114 determines to store and terminate a virtual machine based on one or more indicators (or indications), including various sleep parameters identified above. The adaptive sleep VM management service 114 can use the indicator(s) to determine which virtual machine to store and terminate. For example, one such indicator might be a customer-specified schedule for a given compute instance. The adaptive sleep VM management service 114 can store and terminate that particular compute instance when scheduled. As another example, the adaptive sleep VM management service 114 may make a determination to resume a slept VM bundle when at an account limit, so the adaptive sleep VM management service 114 selects a lower priority compute instance for storing and termination. As yet another example, the adaptive sleep VM management service 114 may make a determination that a future attempt to resume a slept VM bundle would exceed an account limit, so the adaptive sleep VM management service 114 preemptively selects a lower priority compute instance for storing and termination. Note that if an enable is included in the sleep configuration parameters, the pool of virtual machines from which the adaptive sleep VM management service 114 can select for the store and terminate workflow would be based upon those virtual machines having an associated enable set.

In addition to or in place of those indicators based on configuration parameters, the adaptive sleep VM management service 114 may receive indicator(s) from external sources to use in store-and-terminate determinations. One example of external indicator(s) is a customer request. A customer can submit a request (e.g., from an electronic device 102 via the interface 104) to "sleep" a particular compute instance, causing the adaptive sleep VM management service 114 to initiate the storing and termination of that compute instance. As another example of external indicator(s), in some embodiments a proxy server routes traffic to and from a virtual machine. The proxy server can send an indication of network activity to the adaptive sleep VM management service 114, which in turn can use the network activity data to determine to store and terminate a particular virtual machine. Additional details of the proxy server are described with reference to FIG. 4. As another example of external indicator(s), in some embodiments an agent operating in the guest environment of the compute instance may provide an indication of processing or process activity to the adaptive sleep VM management service 114, which in turn can use that activity data to determine to store and terminate a particular virtual machine. Additional details of the agent within the guest environment are described with reference to FIG. 5.

In addition to storing customer- and instance-specific configuration data 116, the adaptive sleep VM management service 114 can maintain tracking data 118. Exemplary tracking data includes, for each compute instance identifier, a status of the compute instance. One such status indicator might be "executing" or otherwise reflect an active compute instance while another might be "bundled" or otherwise reflect a slept state. The adaptive sleep VM management service 114 can base store-and-terminate determinations (described above) and resume determinations (described with reference to FIG. 3) in part on the tracking data 118 (e.g., to select an active instance to store-and-terminate). As the adaptive sleep VM management service 114 manages the compute instances, it can update the tracking data 118 to reflect the current state of those instances.

As indicated at circle 6, the adaptive sleep VM management service 114 sends a store and terminate request to the hardware virtualization service 112, and the hardware virtualization service 112 sends a store and terminate request to the agent 130.

Figure 2:
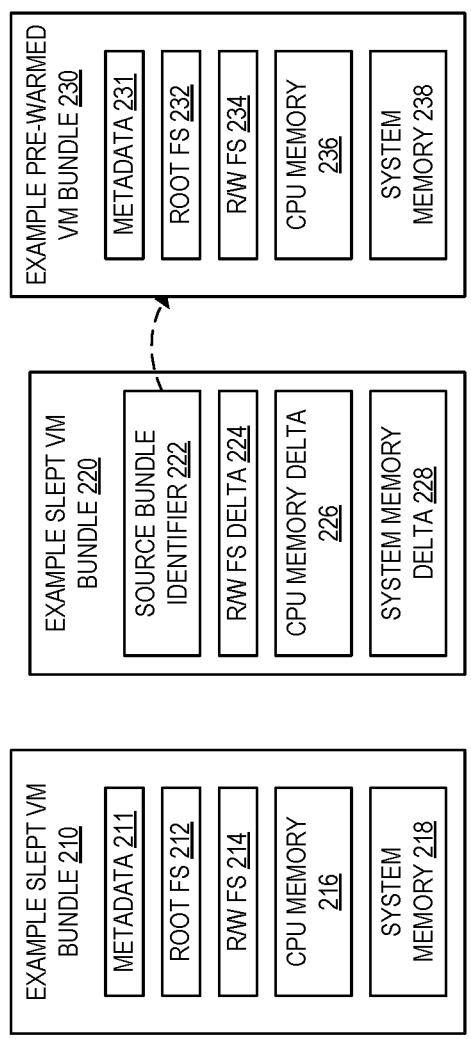
FIG. 2 is a diagram illustrating exemplary slept virtual machine bundles according to some embodiments.

As indicated at circle 7, upon receipt of a store-and-terminate request, the agent 130 typically pauses the executing virtual machine identified in the request, stores data such as state information about that virtual machine in a slept VM bundle 138, and terminates the virtual machine, thereby freeing up resources of the host computer system 120-1 and also reducing the resource usage of the customer (e.g., when account limits or cost controls are in place). The slept VM bundle contains state information to allow a new virtual machine to be created and resumed from the paused state at a later time. Exemplary bundles are described with reference to FIG. 2. The slept VM bundle 138 may be stored locally (e.g., on a solid state or other drive of the host computer system 120-1) and/or with a bundle storage service 150. The bundle storage service 150 may be FIG. 2 is a diagram illustrating exemplary slept virtual machine bundles according to some embodiments. A first exemplary slept VM bundle 210 may be considered a "complete" bundle in that it includes the entire set of data (or "state") from which another virtual machine can resume processing from the pause point at which the source virtual machine was captured. The bundle 210 includes metadata 211, which can include one or more of the launch configuration parameters, described above. As an alternative, launch configuration parameters may be persisted by the hardware virtualization service 112 and/or the adaptive sleep VM management service 114 and passed as part of a later launch request identifying a bundle. The bundle 210 includes a copy of the file system(s) of the virtual machine. In this example, the file system(s) include a root file system 212 (e.g., of root file system 142) and a read/write file system 214 (e.g., of read/write file system 144). The bundle 210 also includes a copy of the processor or CPU memory 216 (e.g., registers) and of the system memory 218 of the virtual machine captured in the bundle.

A second exemplary slept VM bundle 220 may be considered a "delta" bundle in that it includes a reduced set of data (or "state") from which from which another virtual machine can resume processing from the pause point at which the source virtual machine was captured subject to one or more dependencies. In this example, the parts of the bundle 220 include changes relative to a source, pre-warmed bundle (e.g., the bundle from which the virtual machine was originally launched). The bundle 220 includes a source bundle identifier 222 that identifies the other bundle that the delta components of the bundle 220 are relative to. The bundle 220 can omit any read-only file systems since those file system(s) can be restored from the source bundle (e.g., a read-only root file system 232). The bundle 220 can include delta components for the other data such as the read/write file system delta 224, processor or CPU memory delta 226, and system memory delta 228. Delta components include only units that have changed relative to their source counterparts. Exemplary units include registers, blocks, and pages. When preparing a delta component, an agent 130 can compare each unit of the paused virtual machine relative to corresponding unit in the source bundle and store units that have changed in the delta component. In this case, the delta components of the slept VM bundle 220 are relative to a source bundle that is a pre-warmed VM bundle 230. In particular, the read/write file system delta 224 includes changes relative to the read/write file system 234 of the source bundle, the processor or CPU memory delta 226 includes changes relative to the processor or CPU memory 236 of the source bundle, and the system memory delta 228 includes changes relative to the system memory 238 of the source bundle.

Other bundles can be hybridized versions of the "complete" and "delta" bundles, with certain portions of the data being deltas (e.g., the file system(s) and system memory) and other portions of the data being complete (e.g., the CPU memory).

Figure 3:
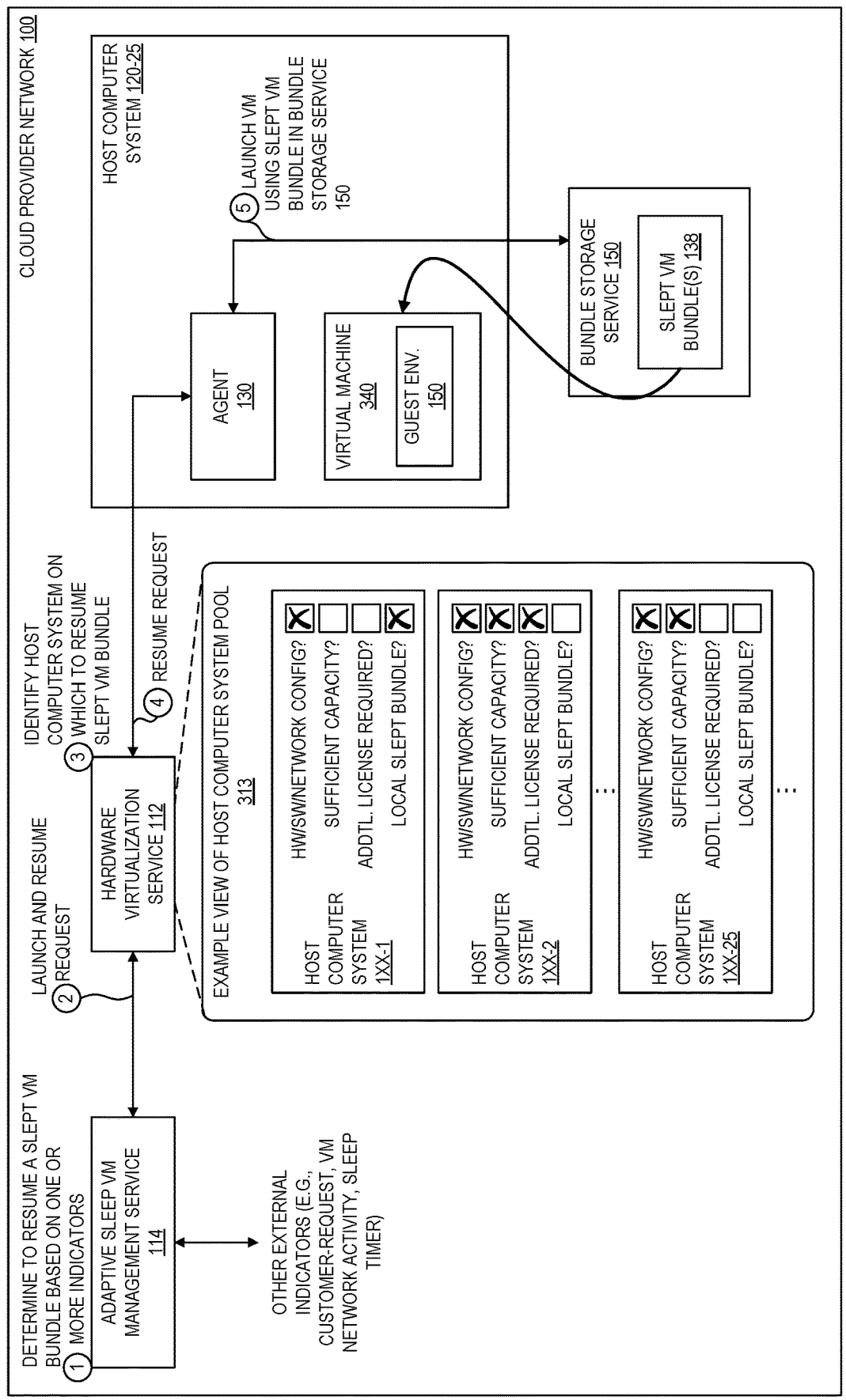
FIG. 3 is a diagram illustrating resuming a virtual machine in a cloud provider network according to some embodiments.

FIG. 3 is a diagram illustrating resuming a virtual machine in a cloud provider network according to some embodiments. An exemplary set of operations amongst components is described with reference to circled numbers 1-5.

As indicated at circle 1, at some point the adaptive sleep VM management service 114 determines to resume a slept VM bundle based on one or more indicators (or indications). The adaptive sleep VM management service 114 can use the indicator(s) to determine which slept VM bundle to resume. For example, one such indicator might be a wake time in a customer-specified schedule for a given compute instance. The adaptive sleep VM management service 114 can resume that particular compute instance when scheduled.

In addition to or in place of those indicators based on configuration parameters, the adaptive sleep VM management service 114 may receive indicator(s) from external sources to use in resume determinations. One example of external indicator(s) is a customer request. A customer can submit a request (e.g., from an electronic device 102 via the interface 104) to "resume" a particular compute instance, causing the adaptive sleep VM management service 114 to initiate the resuming of that compute instance. As another example of external indicator(s), in embodiments with a proxy server, the proxy server can send an indication of network activity to the adaptive sleep VM management service 114, which in turn can use the network activity data to determine to resume a particular virtual machine. As another example of external indicator(s), in embodiments with an agent operating in the guest environment (see FIG. 5 for an example), the agent may have previously sent a sleep request to its host virtual machine that included a sleep time to indicate how long until the slept VM bundle was resumed. Likewise, a customer originated request might also include a sleep time with a sleep request. The adaptive sleep VM management service 114 can track the elapsed time since the receipt of the request or termination of the instance and, upon expiration of the sleep timer, resume the associated slept VM bundle.

As indicated at circle 2, the adaptive sleep VM management service 114 sends a request to resume a slept VM bundle to the hardware virtualization service 112. The request can include an identifier such as the persistent identifier associated with the slept VM bundle.

As indicated at circle 3, the hardware virtualization service 112 then makes a placement determination to select one of the host computer systems 120 from the pool of host computer systems 120-1 to 120-X on which to resume the slept VM bundle.

At a high level, the placement determination can be treated as a bin-packing problem with various constraints and/or preferences. A "view" of an exemplary problem is illustrated in the example view of host computer system pool 313. In this example, the hardware virtualization service 112 evaluates candidate host computer systems based upon two constraints and two preferences. One constraint is whether the host computer system can support the launch configuration parameter(s)—certain host computer systems might not have the requisite hardware or software installed to support resuming the slept VM bundle. In various embodiments, the hardware virtualization service 112 can obtain the launch configuration parameters if tracked locally, as part of the request from the adaptive sleep VM management service 114, and/or from metadata stored with the identified slept VM bundle. Another constraint is whether the host computer system has sufficient available resources or capacity to support resuming the slept VM bundle. For example, if the slept VM bundle requires a 4-gigabyte system memory allocation but a host computer system of the pool only had 3 gigabytes available to allocate to a virtual machine, such a host computer system would not be a suitable candidate for resuming the slept VM bundle.

One preference is to resume the slept VM bundle on a host computer system in a manner that avoids the need to allocate software license(s). For example, if a per-socket license has already been allocated to one processor socket of a host computer system and that processor can support the number of virtual CPUs required by the slept VM bundle, the hardware virtualization service 112 would put additional weight on resuming the slept VM bundle on that host computer system. Another preference is to resume the slept VM bundle on a host computer system that has stored the slept VM bundle locally, typically the host computer system which executed the store-and-terminate request. This preference reduces the latency associated with another agent 130 of another host computer system 120 having to fetch the slept VM bundle from the bundle storage service 150. Note that in cases where multiple host computer systems are equal candidates for resuming a slept VM bundle, the hardware virtualization service 112 can make a random selection from those candidates, for example. In this exemplary flow, the hardware virtualization service 112 selects host computer system 120-25 as it satisfies the two constraints and one of the two preferences.

Continuing the example resume workflow, as indicated at circle 4, the hardware virtualization service 112 sends a resume request to an agent 130 of the selected host computer system 120—in this case the host computer system 120-25. The request can include the identifier associated with the slept VM bundle.

As indicated at circle 5, upon receipt of resume request, the agent 130 obtains the slept VM bundle 138 corresponding with the identifier from the bundle storage service 150. (Of course, if another host computer system having the slept VM bundle stored locally were selected by the hardware virtualization service 112, the agent 130 of that host computer system could launch from that locally stored slept VM bundle.) The agent 130 allocates resources to a new virtual machine that will be used to resume the slept VM bundle and uses the data in the slept VM bundle to bring that new virtual machine to the state of the paused virtual machine from which the slept VM bundle was captured. For example, resuming from a "complete" bundle can entail copying the bundle components into the respective portions of the host system resources allocated for a new virtual machine. Resuming from a "delta" bundle can entail copying the source bundle components into the respective portions of the host system resources allocated for a new virtual machine, followed by updating the portions of those source components reflected in the delta components. In this case, the agent 130 allocates resources to and prepares a virtual machine 340 using the slept VM bundle 138 before unpausing, resuming, or otherwise allowing execution of the virtual machine 340 to proceed. In this manner, customer applications that were executing within the guest environment 150 of the stored and terminated virtual machine 140 continue to execute with little to no interruption within the guest environment 150 of the resumed virtual machine 340.

In some embodiments, prior to the adaptive sleep VM management service 114 determining to resume a slept VM bundle, the adaptive sleep VM management service 114 may preemptively cause another VM to be stored and terminated. For example, the customer may enable such a preemption configuration parameter when configuring the adaptive sleep VM management service 114 for its compute instances to avoid delays associated with the pause, store, and terminate processes when the customer's set of compute instances has reached one of the customer-specified limits and would otherwise prevent the immediate resuming of a slept VM bundle (or launch of a new compute instance) until after another VM was paused, stored, and terminated.

In some embodiments, after the adaptive sleep VM management service 114 determined to resume a slept VM bundle (at circle 1) and before sending the request to resume a slept VM bundle (at circle 2), the adaptive sleep VM management service 114 can send a store and terminate VM request (described with reference to FIG. 1). Such may be the case where preemption is not enabled and the customer's set of compute instances is at one of the customer-specified limits, preventing the resuming of one slept VM bundle (or launch of a new compute instance) until after another VM was paused, stored, and terminated.

A successful resume of the slept VM bundle 138 with virtual machine 340 may be followed by responses indicating such a success flowing back from the agent 130 of the host computer system 120-25 to the hardware virtualization service 112 (in response to the resume request at circle 4) and from the hardware virtualization service 112 to the adaptive sleep VM management service 114 (in response to the request at circle 2).

It is noted that each time an application is slept (and its host compute instance terminated), the control plane is able to re-allocate resources to other tasks. Additionally, each time an application is resumed (by launching a new compute instance), the control plane is afforded another opportunity to optimize the placement of the compute instance, allowing for the more efficient usage of cloud provider network resources (e.g., consolidating certain applications onto fewer machines to reduce license costs, more quickly removing host computer systems from the active pool for maintenance cycles, etc.). Furthermore, having some portion of applications slept at any given time allows for a fixed number of software licenses to be shared by a larger number of virtual machines.

Figure 4:
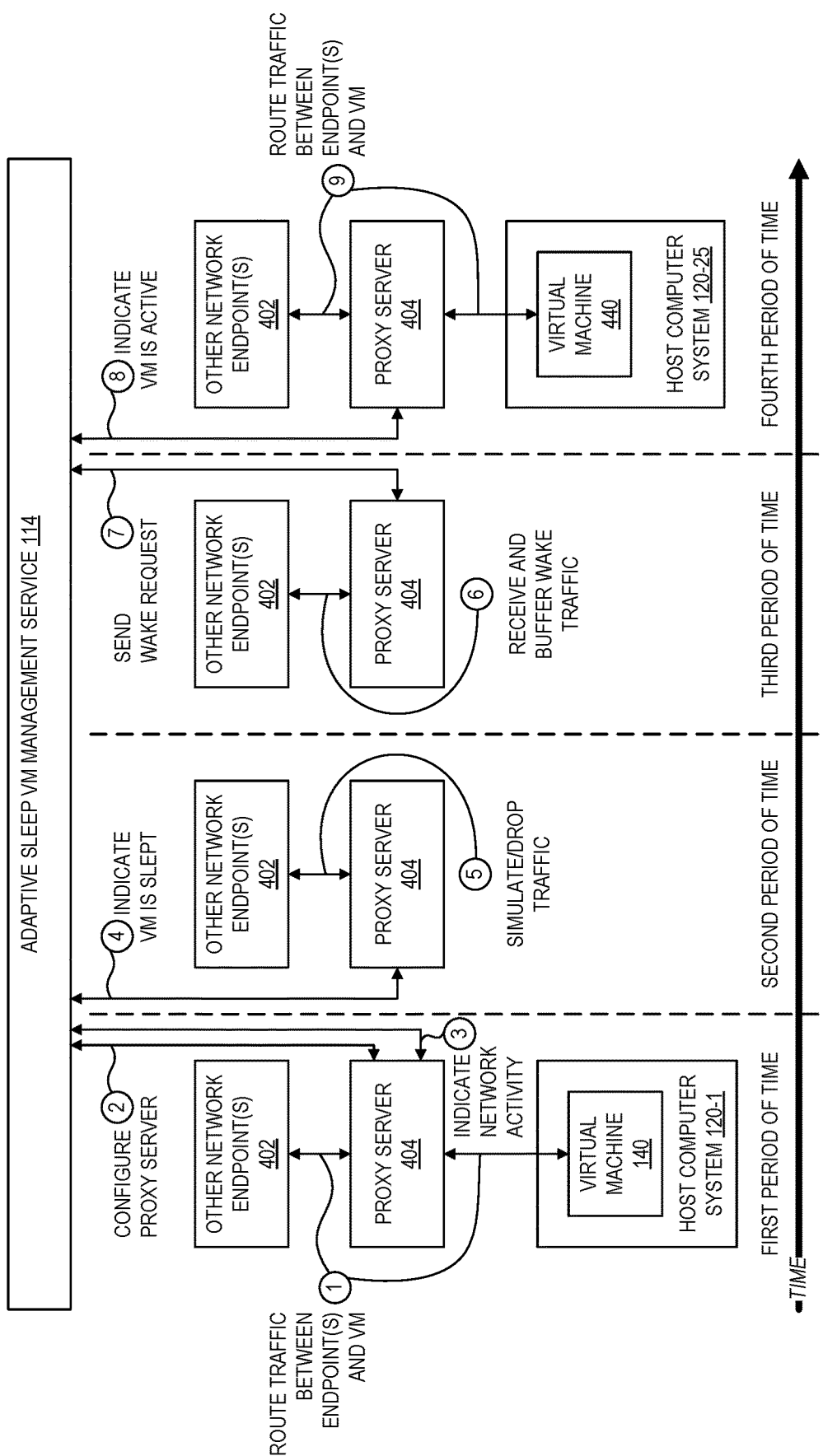
FIG. 4 is a diagram illustrating a proxy server during periods of time when an adaptive sleep virtual machine transitions between executing, slept, and executing according to some embodiments.

FIG. 4 is a diagram illustrating a proxy server during periods of time when an adaptive sleep virtual machine transitions between executing, slept, and executing according to some embodiments. The illustrated environment tracks various networking aspects and indicators used by the adaptive sleep VM management service 114. The environment illustrates operations of a proxy server 404 during four periods of time, as indicated at the bottom of FIG. 4. An exemplary set of operations amongst components illustrated in FIG. 4 is now described with reference to circled numbers 1-9.

As indicated at circle 1 and during the first period of time, traffic to and from the virtual machine 140 on the host computer system 120-1 is routed through the proxy server 404. Such traffic may originate from or be destined to other network endpoint(s) 402, which may be internal or external to the cloud provider network. For example, one endpoint might be a database client executed by another virtual machine within the cloud provider network sending messages to and receiving messages from a database server application executed by the virtual machine 140. As another example, another endpoint might be a web browser application executed by a third-party's personal computer system sending messages to and receiving messages from a web server application executed by the virtual machine 140. The proxy server 404 includes an identifier of the virtual machine 140 such as a persistent identifier, which may also be used to locate the virtual machine 140 on the host computer system 120-1.

To support periods of time where an instance is persisted as a slept VM bundle, the proxy server 404 tracks the state of compute instances. For example, the table below shows an exemplary "instance status" tracking structure that the proxy server 404 maintains based on signals received form the adaptive sleep VM management service 114.

| Identifier | Status |
|---|---|
| ABC | Active |
| DEF | Active |
| GHI | Active |

As shown above, the proxy server 404 is routing traffic for three compute instances—having identifiers "ABC," "DEF," and "GHI"—each of which has an associated "active" virtual machine. In some embodiments, the proxy server 404 can derive the network location of a virtual machine corresponding to a particular identifier from the identifier itself (e.g., if the identifier is a portion of a network address that will be re-assigned after a resume). In other embodiments, the proxy server 404 may store a network address of the virtual machine corresponding to a particular instance identifier. Such a network address may be obtained from the adaptive sleep VM management service 114 in status update indications or from a lookup service (not shown).

In the exemplary description that follows, identifier "DEF" corresponds to the virtual machine 140 during the first period of time and to the virtual machine 440 during the fourth period of time.

As indicated at circle 2, the adaptive sleep VM management service 114 configures the proxy server 404 with additional configuration parameters. The parameters of the configuration can originate from the customer (e.g., in addition to or as part of the sleep configuration parameters described with reference to circle 4 of FIG. 1). One type of configuration parameters may be a set of rules governing how certain traffic is handled when an instance is not in an active state (e.g., "paused"). An exemplary set of rules for an instance with the identifier "DEF"' is shown in the following table.

| Type | Resume? | Simulate? |
|---|---|---|
| SSH | N | N |
| TCP | N | N |
| TCP keepalive | N | Y |
| ICMP | N | Y |
| HTTP | Y | N |
| Packet type 1 | Y | N |

As shown in the table above, the rules may be associated with network-level traffic (e.g., ICMP, TCP), particular operations of network traffic (e.g., TCP keepalive), application-level traffic (e.g., SSH, HTTP), and even application-specific traffic (e.g., using deep packet inspection to determine identify a packet type). Alternatively or in addition to traffic types, rules may be based on network ports. Here, the rules include whether to send a resume request upon receipt of traffic of a particular type and whether to simulate traffic of a particular type. Other configuration data may include certain traffic to ignore/block (e.g., by port number).

Another type of configuration parameter may specify how to handle certain traffic that is neither wake-traffic nor simulate-traffic. For example, a rule may specify that the proxy server 404 should return an error (e.g., host down or host unreachable), not respond (e.g., appear to "hang"), or wait for some defined timeout period before doing anything (e.g., in case some other event causes the associated instance to be resumed before the timeout period ends).

Another type of configuration parameter may specify certain thresholds above or below which the proxy server 404 should issue "sleep" or "resume" requests to the adaptive sleep VM management service 114. Extending the example given in the above table, a configuration rule might specify that a request to sleep an instance be sent if network activity for a certain type of traffic, type(s) of traffic, or aggregate traffic falls below a certain activity level (e.g., in packets per unit time) or ceases for a certain amount of time. Conversely, a configuration rule might specify that a request to wake an instance be sent if network activity for a certain type of traffic, type(s) of traffic, or aggregate traffic rises above a certain activity level (e.g., in packets per unit time) or ceases for a certain amount of time.

In some embodiments, the proxy server 404 can send an indication of the virtual machine 140's network activity to the adaptive sleep VM management service 114, as indicated at circle 3. Such an indication may distinguish amongst traffic types and may represent a level of activity at a point in time or over a period of time. Alternatively, and if so configured, the proxy server 404 may send indications in the form of requests to sleep or resume based on the thresholds described above.

As indicated at circle 4 and advancing into the second period of time, the adaptive sleep VM management service 114 has determined to store and terminate the virtual machine 140 and sends an indication to the proxy server 404 that instance "DEF" or its associated virtual machine 140 will be slept. Upon receipt of that indication, the proxy server 404 can update its status data for the associated instance to indicate that the instance is slept. In the above status table, for example, the proxy server 404 would update its status of instance "DEF" to indicate it was no longer running (e.g., from "active" to "slept," "1" to "0", etc.).

As indicated at circle 5, once the status of an instance is no longer active, the proxy server 404 will begin responding to or ignoring traffic directed to the now-paused virtual machine 140 subject to the rules configured earlier. For example, applying the rules indicated in the above table, the proxy server 404 would respond to TCP keepalive messages to preserve existing TCP sessions and to ICMP messages (e.g., pings) to indicate that the virtual machine 140 is still available. Other types of responses can be simulated. For example, a proxy server might affirmatively respond to netcat (NC) requests against a particular port to check whether a particular process or daemon executed by the virtual machine is running. As another example, a proxy server might respond with an error immediately or after some timeout period for particular traffic types.

As indicated at circle 6 and advancing into the third period of time, at some point the proxy server 404 may receive network traffic of a type that corresponds to one of the wake types in the rules. The proxy server 404 can buffer the request. For example, the proxy server 404 might receive an HTTP request, and, based on the rule indicating that receipt of HTTP traffic is of a wake-type, send a wake request to the adaptive sleep VM management service 114, as indicated at circle 7.

As indicated at circle 8 and advancing into the fourth period of time, the adaptive sleep VM management service 114 has determined to resume a slept VM bundle captured from the now-terminated virtual machine 140 and sends an indication to the proxy server 404 that instance "DEF" or its associated virtual machine 440 has been resumed (typically after the hardware virtualization service 112 has reported a successful resume of a slept VM bundle by the virtual machine 440). Upon receipt of that indication, the proxy server 404 can update its status data for the associated instance to indicate that the instance is active. In the above status table, for example, the proxy server 404 would update its status of instance "DEF" to indicate it was running (e.g., from "slept" to "active," "0" to "1", etc.).

Note that the adaptive sleep VM management service 114 may make a determination to resume a slept VM bundle captured from the virtual machine 140 based on other indicators (e.g., schedule, sleep time, priority, etc.) without receiving a wake request. In such a case, the adaptive sleep VM management service 114 sends an indication that the virtual machine 140 that the instance "DEF" is now active, optionally including an identification of the virtual machine 440 to update the proxy server 404's routing information for future traffic directed to instance "DEF." Conversely, the adaptive sleep VM management service 114 may make a determination to not resume a slept VM bundle captured from the virtual machine 140 upon receipt of a wake request from the proxy server 404 as doing so would violate other limits defined by the customer or would require the store-and-terminate of another, higher priority instance.

As indicated at circle 9, traffic to and from the virtual machine 440 on the host computer system 120-25 is routed through the proxy server 404 in a manner similar to that described above with reference to circle 1 of FIG. 4. Additionally, the buffered request (e.g., as described with reference to circle 6) can be sent from the proxy server 404 to the virtual machine 440.

Figure 5:
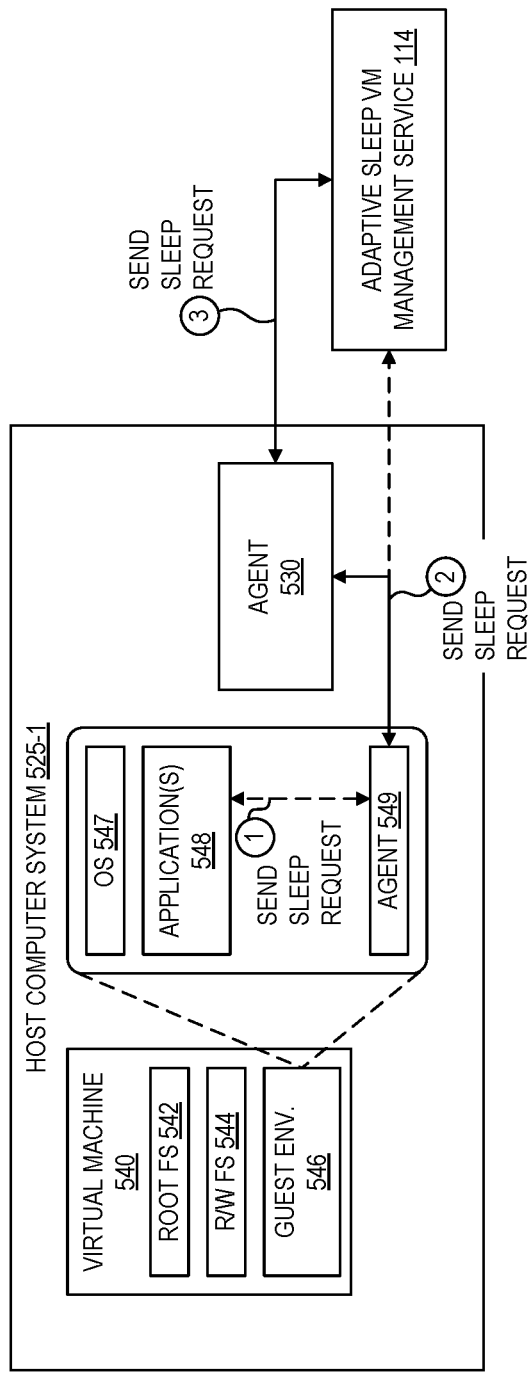
FIG. 5 is a diagram illustrating an agent executing within a guest environment of a virtual machine according to some embodiments.

FIG. 5 is a diagram illustrating an agent executing within a guest environment of a virtual machine according to some embodiments. As shown, a host computer system 525-1 includes an agent 530 (e.g., agent 130) and a virtual machine 540. The virtual machine 540 includes a root file system 542 (e.g., root file system 142), a read/write file system 544 (e.g., read/write file system 144), and a guest environment 546. The guest environment 546 includes an operating system 547 (e.g., operating system 147) and one or more applications 548 (e.g., application(s) 148). The guest environment 546 further includes an agent 549 that can facilitate communications between the guest environment and the agent 530 (e.g., via an intra-process communications channel, a remote procedure call channel, etc.).

An exemplary set of operations amongst components illustrated in FIG. 5 is now described with reference to circled numbers 1-3. As indicated at circle 1, the application 548 can send a request to the agent 549 to sleep itself or the virtual machine within which it is executed. Such a request may be initiated by the application 548 via a call to an API of the agent 14. As indicated at circle 2, the agent 149 subsequently sends a sleep request to the agent 530 via the agent 149 to agent 530 communications channel (e.g., an intra-process communication or remote procedure call). As indicated at circle 3, the agent 530 sends a sleep request to the adaptive sleep VM management service 114. In some embodiments, the request originating from the application 548 can include an amount of time until the application should be resumed (a "sleep" time) or a future time at which to resume the application 548. Upon receipt of the request, the adaptive sleep VM management service 114 can store the sleep or resume time as part of configuration data (not shown) and that time to determine when to resume the customer application 548 from an associated slept VM bundle.

One example situation in which such an application-initiated sleep might be useful is when a customer application might periodically check a network storage location for work and upon either completing the work or determining that there is no work available can be placed into a slept state for a period of time.

In some embodiments, the sleep request indicated at circle 2 may originate from the agent 549 itself rather than from the application 548. The agent 549 can be configured with one or more per-process processor activity thresholds. For example, if a database server application is one of application(s) 548, the agent 549 may include a process activity threshold for that database server. Upon falling below at least one of such thresholds, the agent 549 can originate a sleep request by sending the same to the agent 530. The agent 549 may monitor the activity of each process using a utility of the operating system 547, for example, such as the watch utility.

Note that in some embodiments, although the agent 530 may not have access to process-level activity within the guest environment 548, the agent 530 may nevertheless originate and send a sleep request to the adaptive sleep VM management service 113 based upon the overall processor activity of the virtual machine 540. For example, the adaptive sleep VM management service 114 may receive a processor activity threshold as a configuration parameter from a customer and subsequently configure the agent 530 with that threshold. When the processor activity level for the virtual machine 540 falls below that threshold, the agent 530 can send a sleep request, such as described above, for the virtual machine 540 to the adaptive sleep VM management service 114. The agent 530 may monitor the activity of the virtual machine 540 using a utility of a host operating system (not shown), for example, such as the watch utility.

In some embodiments, the agent 549 may bypass the agent 530 and send sleep requests originating from the agent 549 or an application 548 directly to the adaptive sleep VM management service 514, as indicated by the dashed line.

Figure 6:
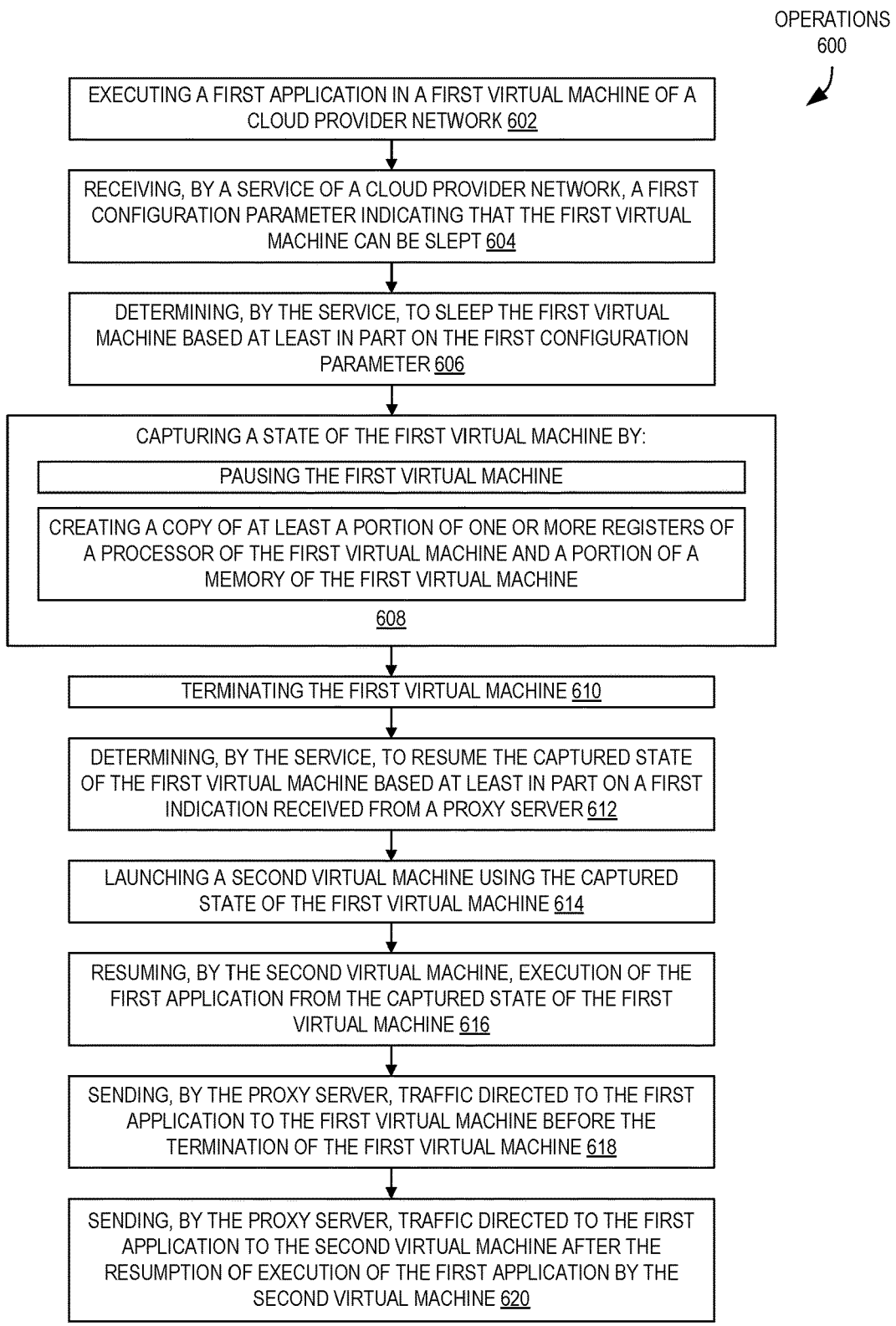
FIG. 6 is a flow diagram illustrating operations of a method for the adaptive sleep of virtual machines according to some embodiments.

FIG. 6 is a flow diagram illustrating operations 600 of a method for the adaptive sleep of virtual machines according to some embodiments. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 600 are performed by a hardware virtualization service 112, an adaptive sleep VM management service 114, an agent 130 of a host computer system 120, a proxy server 404, an agent 549 of a guest environment of a virtual machine of the other figures, such as described herein.

The operations 600 include, at block 602, executing a first application in a first virtual machine of a cloud provider network. For example, and as described with reference to FIG. 1 and elsewhere herein, cloud provider networks 100 often include pools of host computer systems 120. Those host computer systems can be partitioned into multiple "virtual" machines to support the computing requirements of many different users. Various applications can be executed within those virtual machines, such as database applications, analytics applications, web service applications, and so on.

The operations 600 further include, at block 604, receiving, by a service of a cloud provider network, a first configuration parameter indicating that the first virtual machine can be slept. For example, and as described with reference to FIG. 1 and elsewhere herein, the adaptive sleep VM management service 114 can receive various configuration parameters from users or customers of the cloud provider network (e.g., from an electronic device 102; via an interface 104. Once such configuration parameter is an enable to allow the adaptive sleep VM management service to manage a given virtual machine of the user or customer.

The operations 600 further include, at block 606, determining, by the service, to sleep the first virtual machine based at least in part on the first configuration parameter. For example, and as described with reference to FIG. 1 and elsewhere herein, the adaptive sleep VM management service 114 can determine to sleep a virtual machine based on a variety of internal and/or external indicators, including customer configuration parameters and indicators received from customer (e.g., a request), a proxy server 404 (e.g., low network activity), an agent 130 (e.g., low process activity as viewed from a host environment), and/or an agent 430 (e.g., low process activity as viewed from a guest environment).

The operations 600 further include, at block 608, capturing a state of the first virtual machine by pausing the first virtual machine and creating a copy of at least a portion of one or more registers of a processor of the first virtual machine and a portion of a memory of the first virtual machine.

For example, and as described with reference to FIG. 1 and elsewhere herein, an agent that manages virtual machine execution on a host computer system 120, such as an agent 130, can capture the state of an adaptive sleep VM by pausing it and storing state information. Such state information allows another virtual machine to launch and resume execution from the original virtual machine's paused state. Various techniques for capturing the state of a pause virtual machine are possible, including storing state information as part of a bundle, described herein.

The operations 600 further include, at block 610, terminating the first virtual machine. For example, and as described with reference to FIG. 1 and elsewhere herein, an agent that manages virtual machine execution on a host computer system 120, such as an agent 130, can, in addition to launching new virtual machines, terminate existing ones. In doing so, the termination frees resources such as physical host system resources (e.g., memory, processor cycles, network bandwidth) as well as other resources (e.g., software licenses.

The operations 600 further include, at block 612, determining, by the service, to resume the captured state of the first virtual machine based at least in part on a first indication received from a proxy server. For example, and as described with reference to FIG. 3 and elsewhere herein, the adaptive sleep VM management service 114 can determine to resume a slept VM bundle based on a variety of internal and/or external indicators, including customer configuration parameters and indicators received from customer (e.g., a request), a proxy server 404 (e.g., network activity), and/or an agent 130 (e.g., a sleep time).

The operations 600 further include, at block 614, launching a second virtual machine using the captured state of the first virtual machine. For example, and as described with reference to FIGS. 1 and 3 and elsewhere herein, a hardware virtualization service 112 can receive requests to launch virtual machines-whether requests for new adaptive sleep VMs from a customer or to resume existing slept VMs from the adaptive sleep VM management service 112. As part of launching a virtual machine, the hardware virtualization service 112 can coordinate with a local agent (e.g., the agent 130) on a selected host computer system to cause the launch of a virtual machine. The local agent can allocate resources to the virtual machine.

The operations 600 further include, at block 616, resuming, by the second virtual machine, execution of the first application from the captured state of the first virtual machine. For example, and as described with reference to FIG. 3 and elsewhere herein, as part of launching a virtual machine to resume a previously slept virtual machine, an agent can match the state of the newly launched virtual machine to that preserved in state information of the original virtual machine (e.g., from a slept VM bundle) before enabling or otherwise allowing the newly launched virtual machine to begin execution (and thereby resuming applications that were running in the original virtual machine).

The operations 600 further include, at block 618, sending, by the proxy server, traffic directed to the first application to the first virtual machine before the termination of the first virtual machine and, at block 620, sending, by the proxy server, traffic directed to the first application to the second virtual machine after the resumption of execution of the first application by the second virtual machine. For example, and as described with reference to FIG. 4 and elsewhere herein, a proxy server 404 can route traffic between various other network endpoints and an adaptive sleep virtual machine as it transitions from one underlying virtual machine to a slept VM state, and again from the slept VM state to another underlying virtual machine. The proxy server 404 can be configured to handle various forms of traffic in different ways, including reporting network activity levels to the adaptive sleep VM management service 114, reporting indications of receipt of certain kinds of traffic to the adaptive sleep VM management service 114 while an adaptive sleep VM is in a slept state, as well as simulating responses to certain kinds of network traffic while an adaptive sleep VM is in a slept state.

Figure 7:
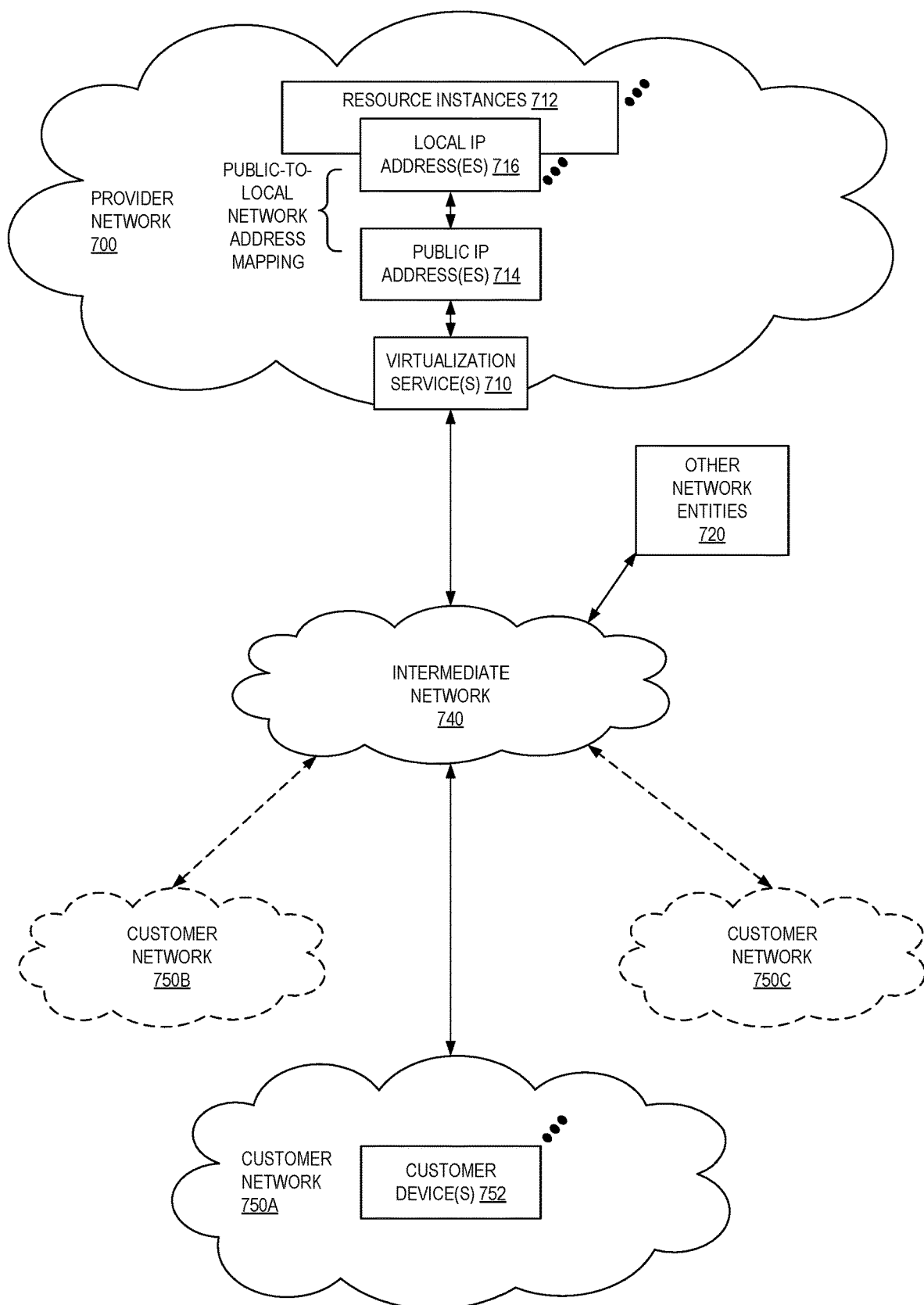
FIG. 7 illustrates an example provider network environment according to some embodiments.

FIG. 7 illustrates an example provider network (or "service provider system") environment according to some embodiments. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some embodiments, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
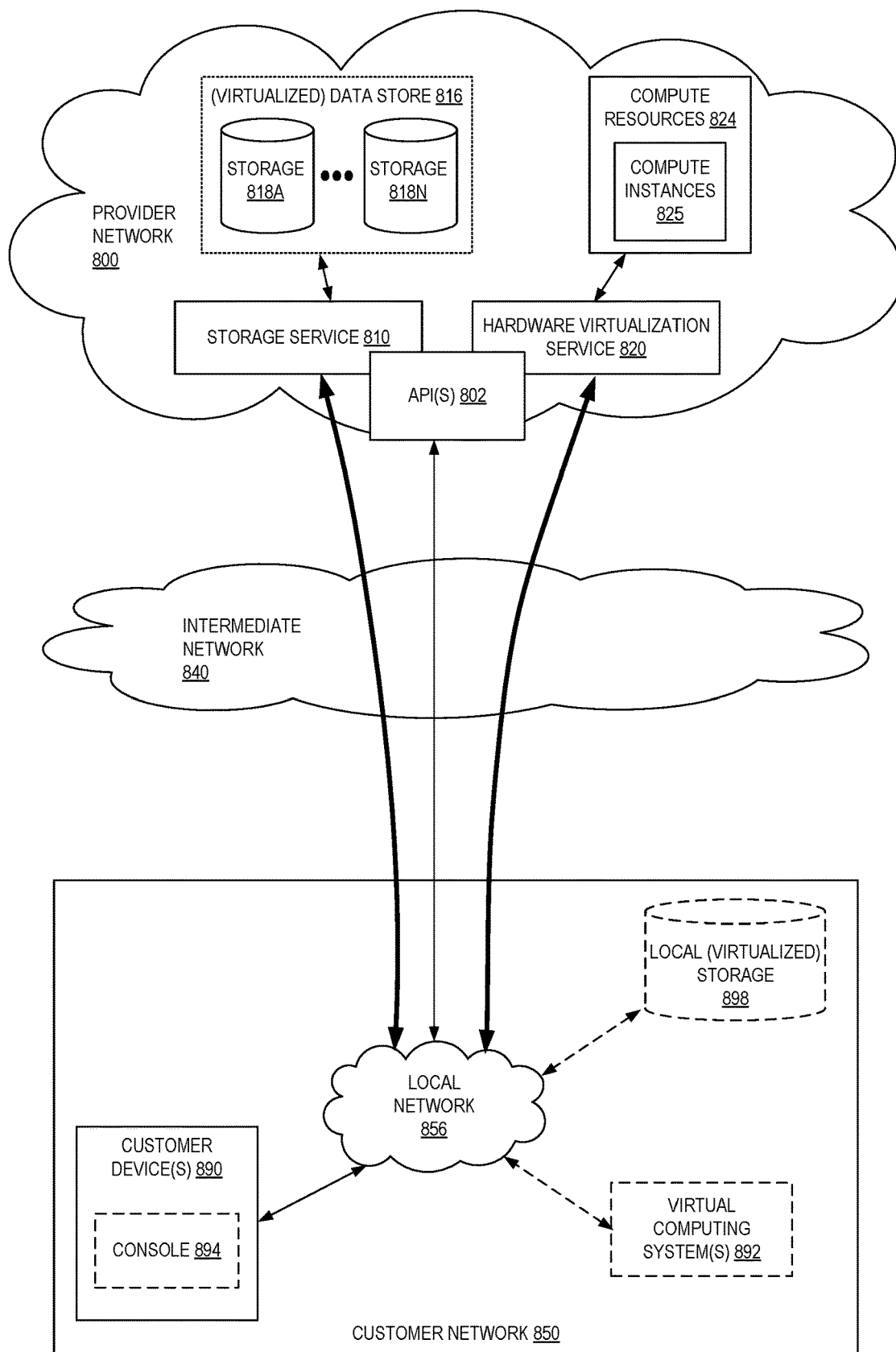
FIG. 8 is a block diagram of an example provider network that provides a storage service and a hardware virtualization service to customers according to some embodiments.

FIG. 8 is a block diagram of an example provider network environment that provides a storage service and a hardware virtualization service to customers, according to some embodiments. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some embodiments, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some embodiments, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some embodiments, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some embodiments, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Figure 9:
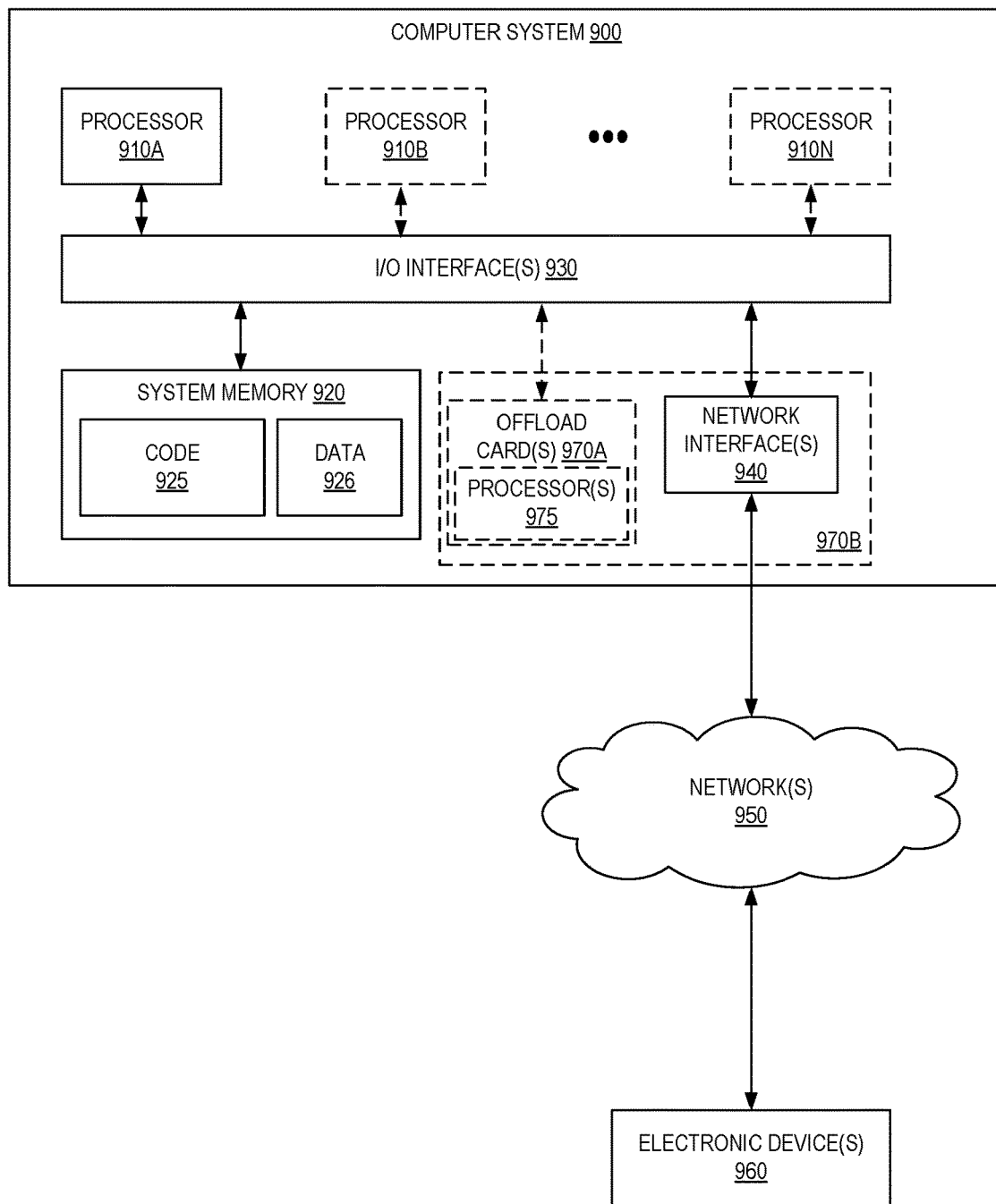
FIG. 9 is a block diagram illustrating an example computer system that can be used in some embodiments.

In some embodiments, a system that implements a portion or all of the techniques described herein can include a general-purpose computer system, such as the computer system 900 illustrated in FIG. 9, that includes, or is configured to access, one or more computer-accessible media. In the illustrated embodiment, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various embodiments the computer system 900 can include one computing device or any number of computing devices configured to work together as a single computer system 900.

In various embodiments, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various embodiments, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various embodiments, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 920 as code 925 (e.g., executable to implement, in whole or in part, the hardware virtualization service 112 as described, the adaptive sleep VM management service 114 as described, an agent 130, 530, and/or 548 as described, a proxy server 404 as described, etc.) and data 926.

In some embodiments, the I/O interface 930 can be configured to coordinate I/O traffic between the processor 910, the system memory 920, and any peripheral devices in the device, including the network interface 940 and/or other peripheral interfaces (not shown). In some embodiments, the I/O interface 930 can perform any necessary protocol, timing, or other data transformations to convert data signals from one component (e.g., the system memory 920) into a format suitable for use by another component (e.g., the processor 910). In some embodiments, the I/O interface 930 can include support for devices attached through various types of peripheral buses, such as a variant of the Peripheral Component Interconnect (PCI) bus standard or the Universal Serial Bus (USB) standard, for example. In some embodiments, the function of the I/O interface 930 can be split into two or more separate components, such as a north bridge and a south bridge, for example. Also, in some embodiments, some or all of the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various embodiments, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations, such as pausing and/or un-pausing compute instances, launching and/or terminating compute instances, performing memory transfer/copying operations, etc. These management operations can, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and cannot coordinate with (or service) any separate hypervisor.

In some embodiments, the system memory 920 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle (R), Microsoft (R), Sybase (R), IBM (R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 818A-818N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   executing a first application in a first virtual machine of a cloud provider network;
   receiving, by a service of a cloud provider network, a first configuration parameter indicating that the first virtual machine can be slept;
   determining, by the service, to sleep the first virtual machine based at least in part on the first configuration parameter;
   capturing a state of the first virtual machine by:
     pausing the first virtual machine; and
     creating a copy of at least a portion of one or more registers of a processor of the first virtual machine and a portion of a memory of the first virtual machine;
   terminating the first virtual machine;
   determining, by the service, to resume the state of the first virtual machine based at least in part on a first indication received from a proxy server;
   launching a second virtual machine using the state of the first virtual machine;
   resuming, by the second virtual machine, execution of the first application from the state of the first virtual machine;
   sending, by the proxy server, traffic directed to the first application to the first virtual machine before termination of the first virtual machine;
   sending, by the proxy server, traffic directed to the first application to the second virtual machine after resumption of execution of the first application by the second virtual machine;
   receiving, by the proxy server, a request of a first traffic type directed to the first virtual machine;
   sending, by the proxy server based at least in part on receiving the request, an indication of the request to the service;
   buffering, by the proxy server, the request;
   receiving, by the proxy server, an indication from the service of the second virtual machine; and
   sending, by the proxy server, the request to the second virtual machine.

2. The computer-implemented method of claim 1, further comprising responding, by the proxy server, to another request of the first traffic type after termination of the first virtual machine and before resuming execution of the first application by the second virtual machine.

3. The computer-implemented method of claim 1, wherein determining to sleep the first virtual machine is further based on at least one of an indication of a level of network activity sent from the proxy server, an indication of a level of processor activity sent from an agent of a host computer system of the first virtual machine, an indication of a level of processor activity sent from an agent of a guest environment of the first virtual machine, a request to sleep received from the agent of the guest environment, or a request from a customer.

4. A computer-implemented method comprising:
   receiving, by a service of a cloud provider network, a first configuration parameter indicating that a first virtual machine can be slept;
   determining, by the service, to sleep the first virtual machine based at least in part on the first configuration parameter;
   capturing a state of the first virtual machine;
   terminating the first virtual machine;
   determining, by the service, to resume the state of the first virtual machine based at least in part on a first indication;
   launching a second virtual machine using the state of the first virtual machine;
   resuming, by the second virtual machine, execution of the state of the first virtual machine;
   sending, by a proxy server, traffic to the first virtual machine before termination of the first virtual machine;
   sending, by the proxy server, traffic to the second virtual machine after resumption of execution of the state of the first virtual machine by the second virtual machine;
   receiving, by the proxy server, a request of a first traffic type directed to the first virtual machine;
   sending, by the proxy server based at least in part on receiving the request, an indication of the request to the service;

buffering, by the proxy server, the request;
receiving, by the proxy server, an indication from the service of the second virtual machine; and
sending, by the proxy server, the request to the second virtual machine.

5. The computer-implemented method of claim 4, further comprising:
receiving, by the service, a second configuration parameter indicating a limit associated with an account of a customer of the cloud provider network; and
wherein determining to resume the state of the first virtual machine is further based on determining that launching the second virtual machine will not violate the limit.

6. The computer-implemented method of claim 4, further comprising:
receiving, by the service, a second configuration parameter indicating a limit associated with an account of a customer of the cloud provider network; and
wherein determining to sleep the first virtual machine is further based on determining that launching another virtual machine would violate the limit.

7. The computer-implemented method of claim 4, further comprising responding, by the proxy server, to another request of the first traffic type after termination of the first virtual machine and before resuming execution of the captured state of the first virtual machine by the second virtual machine.

8. The computer-implemented method of claim 4, wherein the first indication is at least one of the indication of the request, a time in a schedule, a request from a customer, or an expiration of an amount of time to sleep.

9. The computer-implemented method of claim 4, wherein determining to sleep the first virtual machine is further based on at least one of an indication of a level of network activity sent from the proxy server, an indication of a level of processor activity sent from an agent of a host computer system of the first virtual machine, an indication of a level of processor activity sent from an agent of a guest environment of the first virtual machine, a request to sleep received from the agent of the guest environment, or a request from a customer.

10. The computer-implemented method of claim 4, wherein the first virtual machine has a first internet protocol (IP) address, the second virtual machine has a second IP address, and at least a portion of the first IP address and the second IP address are based on an identifier associated with the first virtual machine and the second virtual machine.

11. The computer-implemented method of claim 4, wherein the first virtual machine executes on a first host computer system of the cloud provider network, wherein the second virtual machine executes on a second host computer system of the cloud provider network, and further comprising:
storing, by a first agent of the first host computer system, the state of the first virtual machine with a storage service; and
retrieving, by a second agent of the second host computer system, the state of the first virtual machine from the storage service.

12. A system comprising:
a first one or more electronic devices to implement a service in a multi-tenant provider network, the service including instructions that upon execution cause the service to:
receive a first configuration parameter indicating that a first virtual machine can be slept;
determine to sleep the first virtual machine based at least in part on the first configuration parameter;
cause a capture of a state of the first virtual machine;
cause a termination of the first virtual machine;
determine to resume the state of the first virtual machine based at least in part on a first indication;
cause a launch of a second virtual machine using the state of the first virtual machine;
cause the second virtual machine to resume execution of the state of the first virtual machine;
a second one or more electronic devices to implement a proxy server in the multi-tenant provider network, the proxy server including instructions that upon execution cause the proxy server to:
send traffic to the first virtual machine before termination of the first virtual machine;
send traffic to the second virtual machine after resumption of execution of the state of the first virtual machine by the second virtual machine;
receive a request of a first traffic type directed to the first virtual machine;
send, based at least in part on the request, an indication of the request to the service;
buffer the request;
receive an indication from the service of the second virtual machine; and
send the buffered request to the second virtual machine.

13. The system of claim 12, wherein the service includes further instructions that upon execution cause the service to receive a second configuration parameter indicating a limit associated with an account of a customer of the multi-tenant provider network, and wherein to determine to resume the state of the first virtual machine is further based on determining that launching the second virtual machine will not violate the limit.

14. The system of claim 12, wherein the service includes further instructions that upon execution cause the service to receive a second configuration parameter indicating a limit associated with an account of a customer of the multi-tenant provider network, and wherein to determine to sleep the first virtual machine is further based on determining that launching another virtual machine would violate the limit.

15. The system of claim 12, wherein proxy server includes further instructions that upon execution cause the proxy server to respond to another request of the first traffic type after the termination of the first virtual machine and before resuming execution of the state of the first virtual machine by the second virtual machine.

16. The system of claim 12, wherein the first indication is at least one of the indication of the request, a time in a schedule, a request from a customer, or an expiration of an amount of time to sleep.

17. The system of claim 12, wherein to determine to sleep the first virtual machine is further based on at least one of an indication of a level of network activity sent from the proxy server, an indication of a level of processor activity sent from an agent of a host computer system of the first virtual machine, an indication of a level of processor activity sent from an agent of a guest environment of the first virtual machine, a request to sleep received from the agent of the guest environment, or a request from a customer.

18. The system of claim 12, further comprising:
a third one or more electronic devices of a first host computer system of the multi-tenant provider network, the first host computer system to host the first virtual machine, the first host computer system including instructions that upon execution cause an agent of the first host computer system to:
store the state of the first virtual machine with a storage service of the multi-tenant provider network; and
a fourth one or more electronic devices of a second host computer system of the multi-tenant provider network, the second host computer system to host the second virtual machine, the second host computer system including instructions that upon execution cause an agent of the second host computer system to:
retrieve the state of the first virtual machine from the storage service of the multi-tenant provider network.

19. The system of claim 12, wherein the first virtual machine has a first internet protocol (IP) address, the second virtual machine has a second IP address, and at least a portion of the first IP address and the second IP address are based on an identifier associated with the first virtual machine and the second virtual machine.

\* \* \* \* \*